United States Patent Office 3,331,831
Patented July 18, 1967

3,331,831
BENZINDOLE BASIC DYESTUFFS
Roderich Raue, Alfred Brack, and Ernst-Heinrich Rohe, Leverkusen, Germany, assignors to Farbenfabriken Bayer Aktiengesellschaft, Leverkusen, Germany, a corporation of Germany
No Drawing. Filed June 16, 1964, Ser. No. 375,656
Claims priority, application Germany, July 27, 1963, F 40,359
15 Claims. (Cl. 260—162)

The present invention relates to novel basic dyestuffs; more particularly it relates to basic dyestuffs of the formula

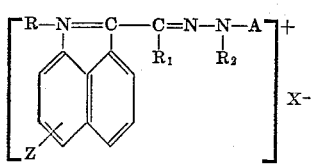

(I)

In this formula R stands for an alkyl residue, in particular a lower alkyl radical having 1 to 5 carbon atoms, or a cycloalkyl, aralkyl or aryl radical; Z means hydrogen, halogen, preferably —Br and —Cl, lower alkoxy or lower dialkyl substituted amino, $R_1$ means hydrogen, lower alkyl, cycloalkyl, aralkyl, aryl or the nitrile group; $R_2$ stands for alkyl, preferably lower alky having 1 to 5 carbon atoms, cycloalkyl or aralkyl; A stands for an aromatic carbocyclic ring system preferably of 1 to 3 rings which may contain condensed heterocyclic ring systems; X is an anion used for salt formation in basic dyestuffs; the radicals R, $R_1$, $R_2$, A and the naphthalene ring may contain further non-ionic substituents such as halogen atoms, in particular —Cl and —Br, carboxylic acid ester or -amide groups, nitrile groups, alkoxy, particularly lower alkoxy groups, aryloxy, alkyl, amino, substituted amino, acylated amino, nitro, acyl, aryl and arylazo groupings.

The novel dyestuffs of Formula I are obtained by treating compounds of the formula

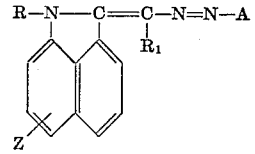

(II)

with quaternising agents of the formula $$R_2\text{—}X \qquad (III)$$

with quaternisation of the azo bridge nitrogen linked with the residue A; R, $R_1$, $R_2$, A and X having the above indicated meaning.

Substituents of the aforementioned type can already be contained in the dyestuffs (I) at the end of the quaternisation reaction, or they can also be introduced into the quaternary dyestuff salts subsequently to the quaternisation reaction; for example, nitro groups can subsequently be converted into amino groups and these, if desired, diazotised and coupled with suitable coupling components. The novel dyestuffs shall be free of sulphonic acid and carboxylic acid groups.

The quaternisation can be carried out by heating a solution or suspension of a compound (II) in an inert medium with the quaternising agent (III) to 60–200° C., preferably 80–130° C. For this purpose, the alkylating agent (III) can also be used in excess as a solvent.

Suitable inert media are, for example, organic liquids such as benzine, ligroin, cyclohexane, benzene, toluene, chloro- and dichlorobenzene, nitrobenzene, tetralin, dioxan and dimethyl formamide.

Suitable quaternising agents (III) are, for example, dimethyl sulphate, diethyl sulphate, di-n-butyl sulphate, di-iso-amyl sulphate, dimethyl-pyrosulphate, benzene- and toluene-sulphonic acid-methyl-, -ethyl-, -n-propyl-, isopropyl- and -isobutyl ester, methyliodide, ethylidodide, n-butylbromide, allylbromide, benzylchloride, benzylbromide, 4-nitrobenzylchloride, 4-methylbenzylchloride, 4-chlorobenzylchloride, β-phenylethylchloride, 2-chloro- and 2-bromodiethyl ether, β - chloroethyl - phenylsulphone, chloro- and bromo-acetic acid ester and methyl-2-chloro-ethyl ketone.

Suitable compounds of the Formula II are listed in the following table; it is to be understood, however, that the performance of the invention and the novel inventive compounds are not restricted to the employment of the listed compounds.

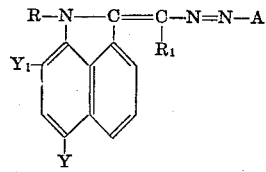

| A | R | $R_1$ | Y | $Y_1$ |
|---|---|---|---|---|
| —⟨phenyl⟩ | $CH_3$ | H | H | H |
| —⟨phenyl⟩—$OCH_3$ | $CH_3$ | H | H | H |
| —⟨phenyl⟩—$OC_2H_5$ | $C_2H_5$ | H | H | H |
| —⟨phenyl⟩—$OC_2H_5$ | $C_2H_5$ | H | Cl | H |

| A | R | $R_1$ | Y | $Y_1$ |
|---|---|---|---|---|
| —C₆H₄—OC₂H₅ | C₂H₅ | H | Cl | Cl |
| —C₆H₄—OC₂H₅ | C₂H₅ | —CN | H | H |
| —C₆H₄—OC₂H₅ | C₂H₅ | —C₆H₅ | H | H |
| —C₆H₄—NHCOCH₃ | C₂H₅ | H | H | H |
| —C₆H₄—NHCOCH₃ | C₂H₅ | H | Br | H |
| —C₆H₄—F | Iso-amyl | H | NO₂ | H |
| —C₆H₄—C₆H₁₁ | n-Propyl | H | C₂H₅ | H |
| —C₆H₄—C₆H₅ | C₂H₅ | H | H | H |
| —C₆H₄—C(=N)(S)—C₆H₃—CH₃ (benzothiazolyl) | C₂H₅ | H | H | H |
| —C₆H₄—N=N—C₆H₅ | C₂H₅ | H | H | H |
| —C₆H₄—N=N—C₆H₅ | —C₆H₅ | H | H | H |
| 2-CH₃-C₆H₃—N=N—C₆H₄—OC₂H₅ | —CH₃ | H | H | H |
| 2,6-(OCH₃)₂-C₆H₂—N=N—C₆H₄—CH₃ | —C₂H₅ | H | H | H |
| 2-CH₃-C₆H₄— | CH₃ | H | H | H |
| 2-C₂H₅-C₆H₄— | C₂H₅ | Benzyl | H | H |
| 2-OCH₃-C₆H₄— | C₂H₅ | H | H | H |
| 2-OC₂H₅-C₆H₄— | CH₃ | H | Br | H |
| 2-F-C₆H₄— | CH₃ | H | Br | Br |
| 2-Cl-C₆H₄— | C₂H₅ | H | H | H |
| naphthyl | C₂H₅ | H | H | H |

| A | R | R₁ | Y | Y₁ |
|---|---|---|---|---|
| 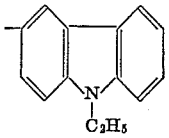 | C₂H₅ | H | H | H |

Compounds of this type can be prepared, for example, from the compounds obtainable according to the process of U.S. patent application No. 356,979, filed Apr. 2, 1964, and now U.S. Patent No. 3,269,998, of the formula

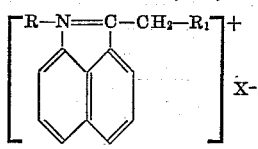

wherein R, R₁ and X have the same meaning as indicated above, and the naphthalene ring may contain non-ionic substituents, in usual manner by reacting aqueous or aqueous-organic solutions of those products with diazonium salt solutions prepared from aromatic-carbocyclic amines.

It has to be understood that the type of the anion X usual in basic dyestuffs does not affect the dyeing properties of the novel dyestuffs. From their preparation the dyestuffs will normally exhibit anions like halide anions, in particular Cl⁻ and/or Br⁻, or sulfonate groups, such as —OSO₃CH₃⁻ or —OSO₃C₂H₅⁻ or p-toluene sulfonate; in general, the nature of the anion depends on the mode of production, purification and/or precipitation of the dyestuff. The anion can, however, be replaced by other anions normally encountered in dyestuff salts of basic dyestuffs by methods known as such; for this purpose the dyestuff salt is first converted into the free base by neutralizing it with a basic reagent, such as sodium carbonate, sodium hydroxide and the like, and when this base is then converted into the form of the desired salt with the corresponding organic or inorganic acid by means of this procedure, it is possible to obtain dyestuff salts which contain, for example, [BF₄]⁻, benzene sulfonate, phosphate, acetate, chloro zincate, perchlorate, NO₂⁻, sulfate, oxalate, formate, citrate, maleinate, tartrate, benzoate, lactate, propionate, butyrate or succinate radicals as the anions.

The novel dyestuffs of Formula I are suitable for the dyeing, printing and colouring in the mass of cellulose esters, polymers and co-polymers of acrylonitrile and vinylidene cyanide, and for the dyeing of paper, coco material and jute. They can further be used for the production of writing liquids and pastes for ballpoint pens or in rubber printing. Dyeings and prints on materials which consist completely or predominantly of polymerised acrylonitrile and/or vinylidene cyanide are distinguished by excellent fastness properties, especially by very good fastness to light, wet processing, decatising, rubbing and sublimation. Noteworthy is also their high colouring strength, the excellent affinity combined with good levelling power, and the property of the new dyestuffs of leaving wool undyed.

The following examples are given for the purpose of illustrating the invention without, however, limiting it thereto, the parts being parts by weight.

Example 1

4 parts of the compound

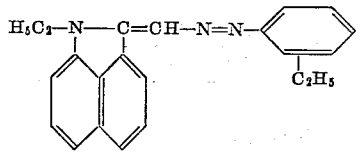

are dissolved in 40 parts of chlorobenzene and heated with 4 parts of dimethyl sulphate at 90–100° C. for 2 hours. The dyestuff of the formula

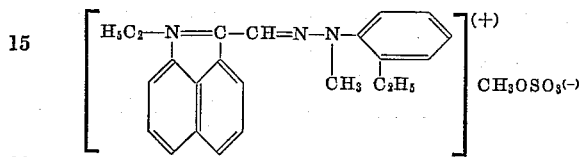

is precipitated in pure form. The yield is approximately quantitative. The dyestuff dyes polyacrylonitrile fabrics in red shades with excellent fastness properties.

By using, instead of the starting product formulated above, the dyestuff bases listed in the following table, the working method being otherwise the same, very valuable new dyestuffs are likewise obtained.

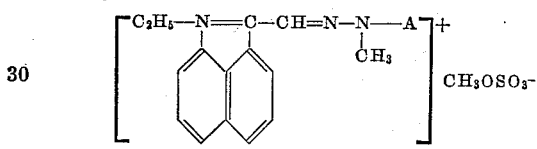

| A | Shade of quaternary salt on polyacrylonitrile fibres |
|---|---|
| —OCH₃ | Bluish violet. |
| 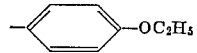—OC₂H₅ | Do. |
| —Cl | Red violet. |
| —F | Bluish red. |
| 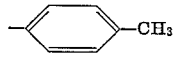—CH₃ | Violet. |
| 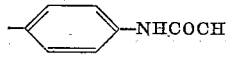—NHCOCH₃ | Blue-violet. |
| 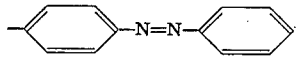—N=N—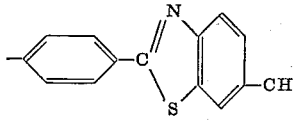 | Do. |
| 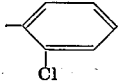 | Violet. |
| 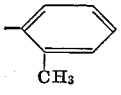 | Yellowish red |
| 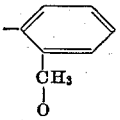 | Bluish red. |
| (CH₃, O) | Bordo. |

The dyestuff bases can be prepared in a manner analogous to that for the coupling product from o-ethyl aniline which was produced according to the following instructions:

4.6 parts of the compound of the formula

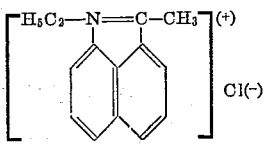

are dissolved in 30 parts of water and coupled with a diazonium salt solution prepared from 2.4 parts of o-ethyl aniline, with the addition of 35 parts of a 4 N sodium acetate solution. The precipitated dyestuff is filtered off with suction and recrystallised from ethanol with the addition of an aqueous ammonia solution. The dyestuff base crystallises in the form of dark-coloured crystals of M.P. 105–106° C. The perchlorate of this compound melts at 259–260° C.

Example 2

A solution of 4 parts of the compound of the formula

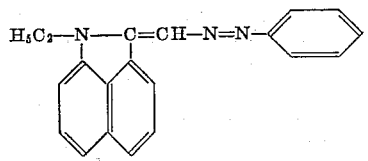

in 40 parts of toluene is heated with 4 parts of dimethyl sulphate on a boiling water-bath for 2–3 hours. The dyestuff of the formula

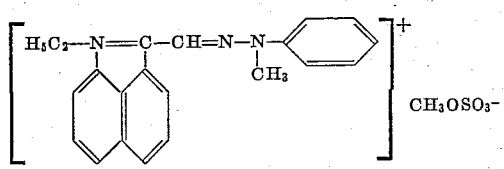

precipitates and is filtered off with suction. It can be purified by redissolving from water with the addition of active charcoal and subsequent salting out, and dyes polyacrylonitrile fibres in ruby-red shades with excellent fastness to light and wet processing.

The starting product can be prepared in the following way:

4.6 parts of the compound of the formula

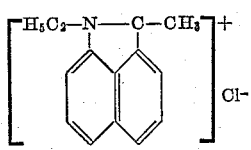

are dissolved in 30 parts of water and treated with an aqueous solution of 2 parts of diazotised aniline. 10 parts of a 4 N sodium acetate solution are added dropwise and after some time the precipitated dyestuff is filtered off with suction. The conversion into the dyestuff base is carried out in usual manner, for example by stirring the hydrochloride with an aqueous ammonia solution.

If in this example the dyestuff base of the following general formula, wherein R' has the below indicated meaning, is used and the base methylated in accordance with the method described above one obtains likewise excellent dyestuffs which dye polyacrylic fibrous materials in the following shades:

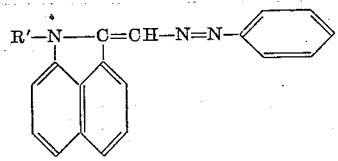

| R': | Shade of the methylation product on polyacrylonitrile |
|---|---|
| Methyl | Ruby-red |
| n-Propyl | Ruby-red |
| Iso-propyl | Ruby-red |
| Benzyl | Red-violet |
| 4-methoxybenzyl | Red-violet |

Example 3

6 parts of the compound of the formula

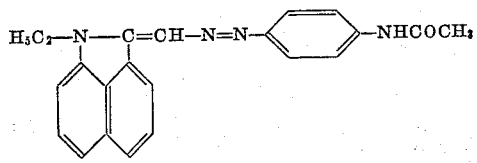

are dissolved in 80 parts of chlorobenzene and, after addition of 6 parts of dimethyl sulphate, heated on a boiling water bath for 3 hours. The resultant dyestuff corresponds to the formula

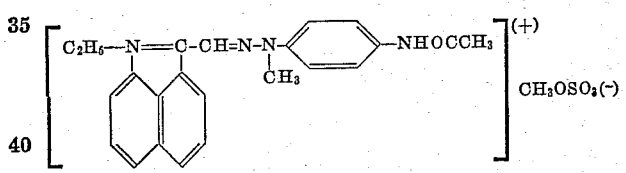

and is isolated and purified in usual manner. The dyestuff dyes fibres of polyacrylonitrile in reddish blue shades with very good fastness properties.

By using, instead of dimethyl sulphate, the equimolecular amount of diethyl sulphate, there is obtained by the same working method a dyestuff which likewise dyes polyacrylonitrile materials in reddish blue shades with very good fastness properties.

Example 4

10 parts of the dyestuff salt obtained according to Example 3, of the formula

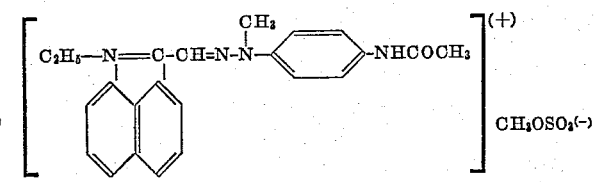

are heated, for saponification of the acetylamino group, with a mixture of 172 parts of water and 28 parts of 20% hydrochloric acid at boiling temperature for 3 hours, and the reaction mixture is buffered with a 4 N sodium acetate solution. The resultant dyestuff is isolated by salting out. It dyes fibres of polyacrylonitrile in blue shades with excellent fastness properties.

Example 5

10 parts of the dyestuff obtained according to Example 3 are saponified as indicated in Example 4 and the hydrochloric acid solution is diazotised with sodium nitrite in 8 parts of water and then treated with a solution of 5.4 parts of 3-methyl-5-pyrazolone-1-carboxylic acid-amidine hydrochloride, 2 parts of sodium hydroxide and 8.4 parts of crystalline sodium acetate in 80 parts of water. After 4 hours, the precipitated dyestuff is filtered off with suction, washed with water and dried in a vacuum. The dyestuff corresponds to the formula

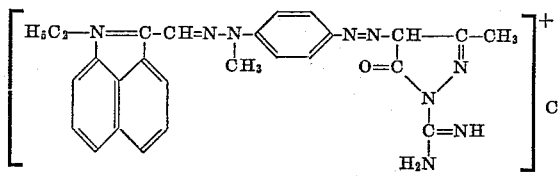

and dyes materials of polyacrylonitrile in blue-grey shades.

When using for an otherwise unchanged working method, instead of 3-methyl-5-pyrazolone-1-carboxylic acid-amidine hydrochloride, the coupling components listed in the following table, quaternised dyestuffs are obtained, which dye fibres of polyacrylonitrile in the stated shades.

| Coupling component: | Shade on polyacrylonitrile fibers |
|---|---|
| 1-phenyl-3-methyl-pyrazolone-(5) | Grey-blue |
| m-Cresol | Violet |
| N-methyl-N-β-cyanoethyl aniline | Red-violet |
| 1-(2-chlorophenyl)-3-methyl-pyrazolone-5 | Grey-blue |
| 1-(3-chlorophenyl)-3-methyl-pyrazolone-5 | Grey-blue |
| 1-(4-nitrophenyl)-3-methyl-pyrazolone-5 | Grey-blue |
| 1 - (4-methylsulphonylphenyl)-3-methyl-pyrazolone-5 | Grey-blue |
| 3-methyl-pyrazolone | Reddish blue |
| 1-phenyl-pyrazolone-5-carboxylic acid ethylester-3 | Reddish blue |
| 1-phenyl-pyrazolone-5-carbonamide-3 | Reddish blue |
| Acetic acid anilide | Violet |
| Resorcin | Violet |
| Dimethylaniline | Violet |
| Diethylaniline | Violet |
| N-methyl-N-hydroxyethylaniline | Violet |
| N,N-dioxyethylaniline | Violet |
| 3-methyl-N-methyl-N-hydroxyethylaniline | Violet |

*Example 6*

8 parts of the compound of the formula

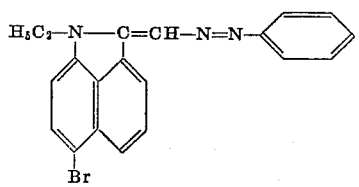

are dissolved in 120 parts of hot toluene and, after addition of 8 parts of dimethyl sulphate, heated at 95–100° C. for 3 hours. The precipitated product is filtered off with suction and purified by redissolving from water. The dyestuff dyes materials of polyacrylonitrile in violet shades with very good fastness properties.

When using, instead of the above-mentioned starting product, the dyestuff bases listed in the following table, the working method being otherwise the same, very valuable dyestuffs of the following constitution

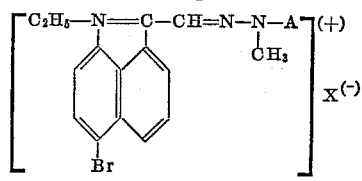

are likewise obtained.

| A | Shade of quaternary salt on polyacrylonitrile fibres |
|---|---|
| —⟨⟩—OC₂H₅ | Blue. |
| —⟨⟩—OCH₃ | Reddish blue. |
| —⟨⟩—NHCOCH₃ | Reddish blue. |
| —⟨⟩—C(=N)(S)—⟨⟩—CH₃ | Violet. |

The dyestuff bases can be prepared in analogy to the coupling product obtained from aniline in the following manner:

12.4 parts of the compound of the formula

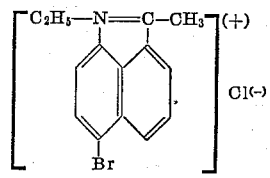

are dissolved in 80 parts of water and coupled with a diazonium salt solution from 3.6 parts of aniline. After buffering the reaction mixture with a 4 N sodium acetate solution, the precipitated dyestuff salt is filtered off with suction, dissolved in 200 parts of hot ethanol, filtered and the azo dyestuff base is separated from the filtrate with a small amount of an aqueous ammonia solution (M.P. 103–104° C.).

*Example 7*

If in the process described in Example 1 3.5 parts of the compound

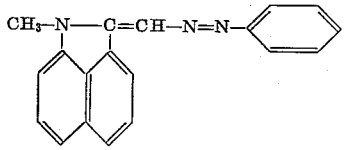

are used as starting material and the alkylation carried out with dimethyl sulphate a red dyestuff is likewise obtained which dyes polyacrylics red shades with excellent fastness properties.

The type of anions in the new dyestuffs is irrelevant to the tinctorial properties of the dyestuffs. The dyestuffs of the foregoing examples may likewise contain other anions, e.g. those mentioned in column 5, lines 27 to 48.

We claim:
1. A dyestuff of the formula:

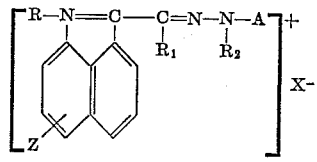

wherein R stands for lower alkyl, phenyl, benzyl, or 4-methoxybenzyl; Z stands for hydrogen, chlorine, bromine, lower alkoxy, or di-lower-alkylamino; $R_1$ stands for hydrogen, lower alkyl, phenyl, or benzyl; $R_2$ stands for lower alkyl, allyl, benzyl, nitrobenzyl, methylbenzyl, chlorobenzyl, phenylethyl, chloroethyl, bromoethyl, or ethoxyethyl; A stands for a radical of the benzene or naphthalene series; and X stands for an anion used for salt formation in basic dyestuffs.

2. A dyestuff of claim 1 wherein R stands for $CH_3$.
3. A dyestuff of claim 1 wherein R stands for $C_2H_5$.
4. A dyestuff of claim 1 wherein $R_1$ stands for hydrogen.
5. A dyestuff of claim 1 wherein $R_2$ stands for $CH_3$.
6. A dyestuff of claim 1 wherein $R_2$ stands for $C_2H_5$.
7. A dyestuff of the formula

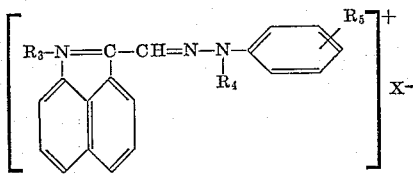

wherein $R_3$ stands for a member taken from the class consisting of $CH_3$ and $C_2H_5$, $R_4$ stands for a member taken from the class consisting of $CH_3$ and $C_2H_5$, $R_5$ stands for a member selected from the class consisting of hydrogen, lower alkoxy having 1 to 2 carbon atoms, lower alkyl having 1 to 2 carbon atoms, chlorine, bromine, acetylamino and 5-pyrazolone-4-azo, and X stands for an anion.

8. The dyestuff of the formula

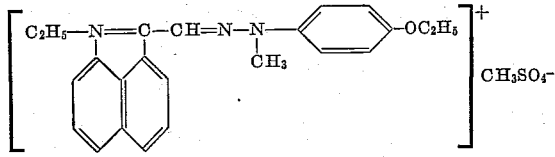

9. The dyestuff of the formula

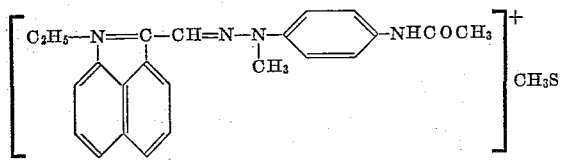

10. The dyestuff of the formula

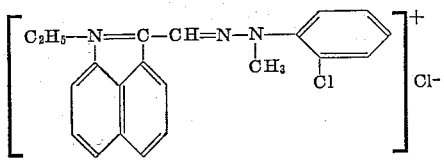

11. The dyestuff of the formula

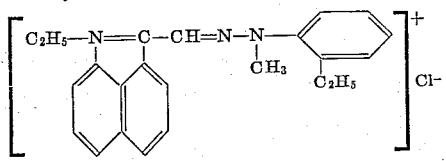

12. The dyestuff of the formula

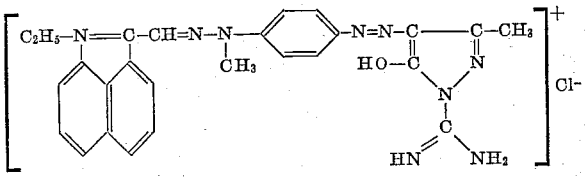

13. The dyestuff of the formula

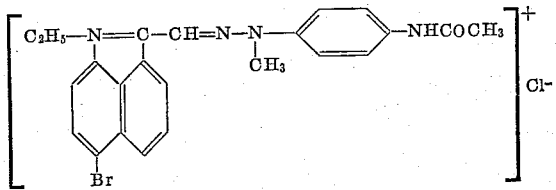

14. The dyestuff of the formula

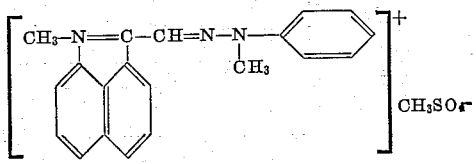

15. The dyestuff of the formula

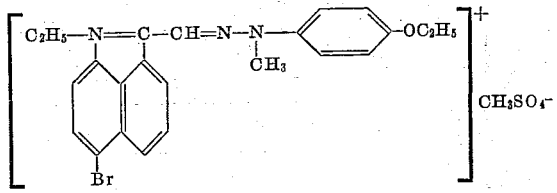

References Cited
UNITED STATES PATENTS 2,815,338   12/1957   Ruegg _____ 260—152

OTHER REFERENCES

Rosenhauer et al.: Ber. Deut. Chem.; vol. 59, pp. 2413–16 (1926).

CHARLES B. PARKER, *Primary Examiner*.

FLOYD D. HIGEL, *Assistant Examiner*.

UNITED STATES PATENT OFFICE
CERTIFICATE OF CORRECTION

Patent No. 3,331,831                                 July 18, 1967

Roderich Raue et al.

It is hereby certified that error appears in the above numbered patent requiring correction and that the said Letters Patent should read as corrected below.

Column 1, line 38, for "alky" read -- alkyl --; column 2, line 38, for "ethylidodide" read -- ethyliodide --; column 5, line 14, for "3,269,998" read -- 3,299,092 --; column 6, in the table, first column, last formula thereof, for that portion reading

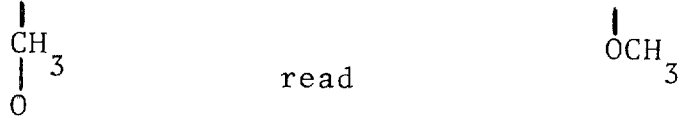

Signed and sealed this 1st day of October 1968.

(SEAL)
Attest:

Edward M. Fletcher, Jr.                             EDWARD J. BRENNER
Attesting Officer                                        Commissioner of Patents